(12) United States Patent
Zhuang et al.

(10) Patent No.: US 11,315,122 B2
(45) Date of Patent: Apr. 26, 2022

(54) AUTHENTICATION METHOD FOR E-WALLET CARRIER

(71) Applicant: CoolBitX Ltd., Grand Cayman (KY)

(72) Inventors: Jay Zhuang, Taipei (TW); Shih-Mai Ou, Taipei (TW)

(73) Assignee: COOLBITX LTD., Grand Cayman (KY)

( * ) Notice: Subject to any disclaimer, the term of this patent is extended or adjusted under 35 U.S.C. 154(b) by 385 days.

(21) Appl. No.: 16/388,504

(22) Filed: Apr. 18, 2019

(65) Prior Publication Data

US 2020/0334683 A1     Oct. 22, 2020

(51) Int. Cl.
*G06Q 20/40* (2012.01)
*G06Q 20/36* (2012.01)
*H04L 9/08* (2006.01)

(52) U.S. Cl.
CPC ..... *G06Q 20/40975* (2013.01); *G06Q 20/363* (2013.01); *G06Q 20/4014* (2013.01); *H04L 9/0897* (2013.01); *H04L 2209/56* (2013.01)

(58) Field of Classification Search
CPC .... G06Q 30/08; G06Q 10/10; G06Q 30/0601; G06Q 40/04; G06Q 20/401; G06Q 20/40975; G06Q 20/4014; G06Q 20/363; G06Q 20/367; G06Q 20/36; G06Q 20/3674; G06F 16/1805; G06F 8/61; G06F 21/32; G06F 21/472; H04L 65/605; H04L 67/306; H04L 69/08; H04L 9/0637; H04L 9/0897; H04L 2209/56; H04L 9/3226; H04L 9/0894
See application file for complete search history.

(56) References Cited

U.S. PATENT DOCUMENTS

| 6,138,907 A * | 10/2000 | Mori ............. G06Q 20/10 235/379 |
| 2001/0050990 A1* | 12/2001 | Sudia ........... G06Q 20/3829 380/286 |
| 2002/0095569 A1* | 7/2002 | Jerdonek ....... H04L 9/3247 713/155 |
| 2003/0046249 A1* | 3/2003 | Wu .................. G07F 7/02 705/79 |
| 2004/0064332 A1* | 4/2004 | Zou ............. G06Q 10/1057 705/30 |

(Continued)

*Primary Examiner* — Johann Y Choo
(74) *Attorney, Agent, or Firm* — Rabin & Berdo, P.C.

(57) ABSTRACT

The present disclosure provides an authentication method for e-wallet carrier, wherein the e-wallet carrier is stored with an authentication program, and the method comprises: an escrow institution constructs user information and a user database, and the user database has private and public key information; the escrow institution generates authentication information through the authentication program, and transmits the private key information as well as authentication program to the carrier to make the carrier in a restricted mode; when receiving verification information and confirming that its user information is correct, the escrow institution provides the authentication information to the user; after electronic receives the authentication information, the carrier is switched to be in a unlocked mode, thus to make transactions in currency. Through this, the information content of the private key information is in the custody of the escrow institution reduce the risk of man-caused loss in the private key information.

5 Claims, 16 Drawing Sheets

(56) References Cited

U.S. PATENT DOCUMENTS

2009/0076941 A1* 3/2009 Schneierson .......... G06Q 40/04
 705/37
2009/0276861 A1* 11/2009 Russo ................. G06F 11/1469
 726/30

* cited by examiner

AUTHENTICATION METHOD FOR E-WALLET CARRIER

FIELD OF THE DISCLOSURE

The present disclosure relates to an authentication method for e-wallet carrier, and more particularly, to an issuance authentication method where digital currencies and private key information are in the custody of an escrow institution.

BACKGROUND

With the technology going forward, many transactions and payment methods have been gradually replaced by integrated circuit (IC) cards. The memory set inside the IC card can store the information of the cardholders, and is widely applied in various occasions. For example, ATM cards, financial cards, credit cards, telephone cards, and stored value cards are currently common IC cards. According to the way of storing and reading data, IC cards can be generally divided into three types: contact interface, contactless interface and composite interface.

Take a financial card with the function of credit card and ATM card for example. The ATM requires the cardholder to input a pre-set password to obtain the right of using the financial card before using the financial card to perform transactions or services through the ATM. Therefore, even if the financial card is lost or stolen, the non-original cardholder cannot steal the cash through the ATM because of not knowing the pre-set password. But, the ATM only determines whether to make cash withdrawals according to the preset password, and the ATM cannot determine whether the financial card is of the correct original cardholder, such that if the non-original cardholder knows the pre-set password, the ATM will still make cash withdrawals, so the non-original cardholder can steal the cash. Furthermore, when the cardholder uses the financial card for consumption, the cardholder will be required to sign the name of the cardholder on the transaction document, such that if the financial card is lost or stolen, the non-original cardholder easily forges a signature or makes unauthorized charges to cause damage to property.

Furthermore, with the rapid advancement of wireless transmission technology, some ICs adopt wireless transmission technology (RFID/Radio-frequency identification), and such radio frequency technology is most frequently applied in consumption transactions in smaller amount, such as taking public transportation, for example, bus, mass rapid transit, and the like, which can be charged by using a easycard through wireless sensing. However, in the case of such small amount of consumption to pursue speed and convenience, inputting a password or signing the name of the cardholder will not be required when the transaction is made. Therefore, as long as the IC card that uses the wireless sensor for consuming is lost or stolen, the non-original cardholder who picks up the IC card can directly perform the consumption transaction until the IC card is deactivated or the amount of internal storage runs out.

Furthermore, as for the IC card used for an access control system, for speed and convenience, it can be usually easy to enter and exit area with access control as long as holding the correct IC card. Therefore, when the IC card used for the access control system is lost or stolen, the non-original cardholder who takes the IC card can also directly enter and exit the access control area through the obtained IC card.

SUMMARY

The main purpose of the present invention is that an escrow institution keeps information content of private key information, and the custody responsibility of the private key information is passed on the escrow institution from the user, such that the escrow institution can assist the user in protecting the private key information to reduce the risk of man-caused loss in private key information.

The secondary purpose of the present invention is that when a carrier is lost, the escrow institution can directly transfer the digital currency of the public key information to other accounts by using the kept private key information; in this way, even if the carrier is lost and taken by a non-original owner, the non-original owner cannot make a transfer in the digital currency because the digital currency of the public key information has been transferred out. Therefore, the digital currency avoids being stolen by a person having other motives.

To achieve above-mentioned purpose, the present invention relates to an authentication method for e-wallet carrier, wherein the e-wallet carrier is stored with an authentication program, and the authentication method comprises the following steps of: a user creating step: an escrow institution comprising a user database stored with user information creates a piece of first private key information and a piece of first public key information according to the user database; a carrier issuing step: the escrow institution generates a piece of first authentication information according to the authentication program and stores the first private key information as well as the authentication program into a first carrier as the e-wallet carrier, and then the first carrier is issued to the user; a first-authentication-information-providing step: after the user obtains the first carrier, the escrow institution receives a piece of first verification information including the user information from the user and provides the first authentication information to the user when confirming that the user information of the first verification information is correct; and a first authentication step: after the first carrier is connected with an electronic device and receives the first authentication information inputted by the user via the electronic device, the first carrier can be switched from a restricted mode that is incapable of connecting with any electronic device to an unlocked mode that consents to connect to the electronic device and can perform digital currency transactions.

In the present embodiment, the escrow institution can provide the first authentication information to the user by one method of voice message, webpage, text message, EMAIL, and communication software.

In a preferred embodiment, the authentication method for e-wallet carrier further comprises the following steps of: a carrier-loss-confirming step: the escrow institution receives the user information and a piece of loss information showing that the first carrier is lost, and accordingly the escrow institution uses the first private key information corresponding to the user information to transfer the digital currency of the public key information to an escrow account, and then creates a piece of second private key information and a piece of second public key information according to the user database; a carrier reissuing step: the escrow institution creates a piece of second authentication information generated by the authentication program, and the escrow institution transmits the second private key information and the authentication program to a second carrier as the e-wallet carrier, and then the second carrier is reissued to the user.

Next, a second-authentication-information-providing step is as follows: after the user obtains the second carrier, the escrow institution receives a piece of second verification information including the user information from the user and provides the second authentication information to the user when confirming that the user information of the second verification information is correct, and then the escrow institution transfers the digital currency of the escrow account to the second public key information of the user database; wherein in the second-authentication-information-providing step, when the escrow institution confirms that the user information of the second verification information is incorrect, the escrow institution would not transfer the digital currency to either of the first public key information or the second public key information of the user database. Moreover, a second authentication step is as follows: the second carrier is connected with the electronic device and receives the second authentication information inputted by the user via the electronic device, and then the second carrier is accordingly switched to be in the unlocked mode.

In another preferred embodiment, the authentication method for e-wallet carrier further comprises the following steps of: a damaged-carrier-replacing: the escrow institution receives the user information and a piece of damage information showing the damage of the first carrier, and accordingly the escrow institution creates a piece of third authentication information generated by the authentication program, and transmits the authentication program and the first private key information corresponding to the user information to a third carrier as the e-wallet carrier, and then the third carrier is issued to the user as a replacement; a third-authentication-information-providing step is as follows: after the user obtains the third carrier, the escrow institution receives third verification information including the user information from the user and provides the third authentication information to the user when confirming that the user information of the third verification information is correct; and a third authentication step is as follows: the third carrier is connected with the electronic device and receives the third authentication information inputted by the user via the electronic device, and then the third carrier is accordingly switched to be in the unlocked mode.

The present invention has the characteristic that after creating the private key information, the escrow institution would store the private key information; through this the escrow institution can assist the user in protecting the information content of the private key information, such that custody responsibility of the private key information is passed on the escrow institution from the user, and thus the escrow institution can protect the private key information to reduce the risk of man-caused loss in private key information.

Furthermore, when a carrier is lost, the escrow institution can directly use the kept private key to transfer the digital currency of the public key information to an escrow account; in this way, even if the carrier is lost and taken by a non-original owner, the non-original owner cannot make a transfer in the digital currency through the obtained carrier because the digital currency of the public key information has been transferred out and into the escrow account. Therefore, the digital currency avoids being stolen by a person having other motives.

DETAILED DESCRIPTION OF PREFERRED EMBODIMENTS

Figure 1:
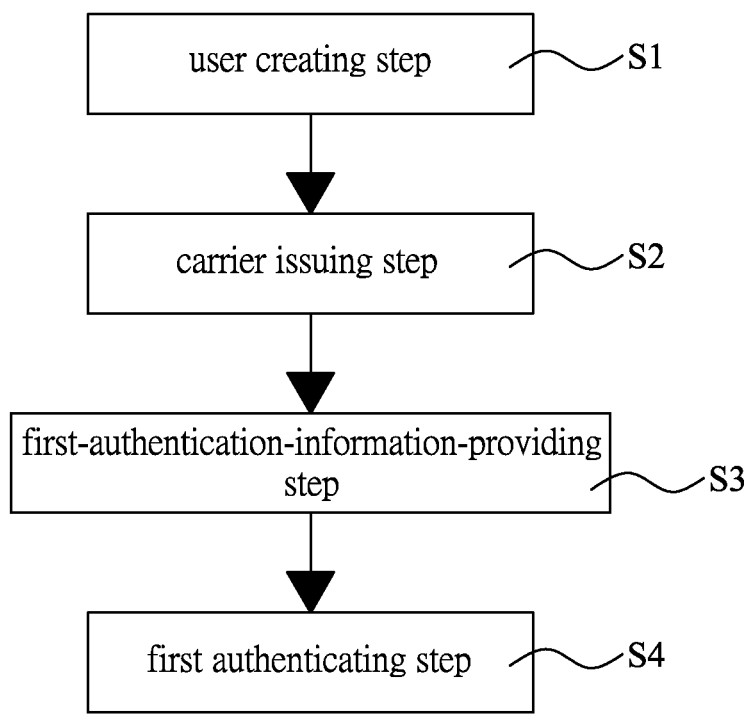
FIG. 1 is a schematic illustrating process flowchart in the authentication method for e-wallet carrier of the present invention.
Figure 2:
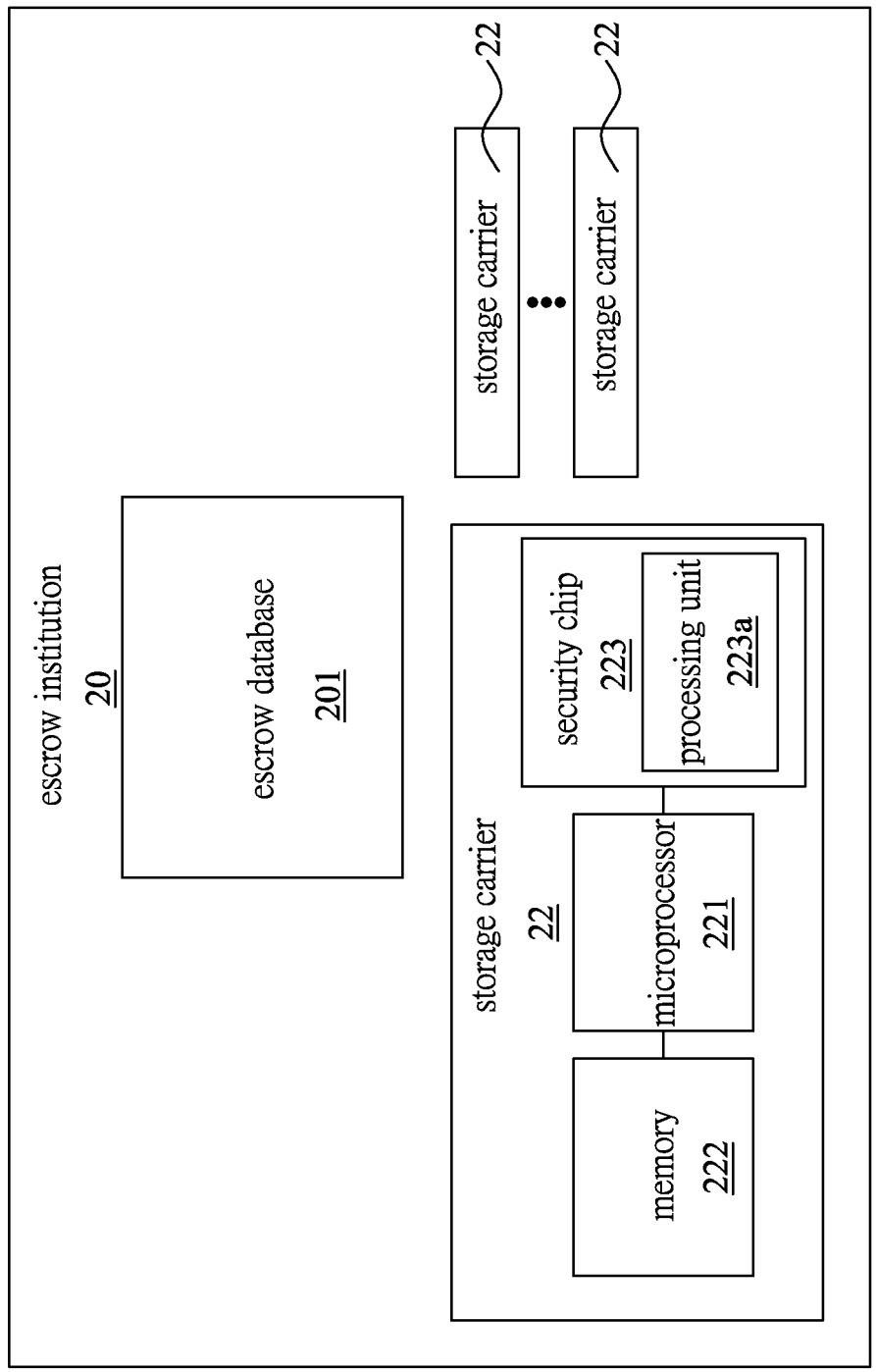
FIG. 2 is a schematic illustrating modular view of the authentication system of e-wallet carrier.

In order to further understand the structure, usage and features of the present invention more clearly and specifically, the present invention is described in detail below with references to the accompanying drawings and specific preferred embodiments:

Please refer to FIGS. 1 and 2. An authentication method for e-wallet carrier 1 of the present invention is used in conjunction with an authentication system of e-wallet carrier 2. The authentication system of e-wallet carrier 2 has an escrow institution 20 and an electronic device 21; the escrow institution 20 has an escrow database 201 and the escrow institution 20 may provide a plurality of carriers 22; wherein, each carrier 22 is equipped with a microprocessor 221 capable of processing information, a memory 222 capable of storing information and a security chip 223 for storing important information; the memory 222 and the security chip 223 both are electrically connected to the microprocessor 221, wherein the memory 222 is not stored with any information and thus in an initial mode, while the security chip 223 has a processing unit 223a that can process the information. In the present embodiment, the carrier 22 is configured as an integrated circuit (IC) card; furthermore, the electronic device 21 has an identification code able to recognize the electronic device identity, and in the present embodiment, the electronic device 21 may be set as a cellphone, a computer or a tablet.

Figure 3:
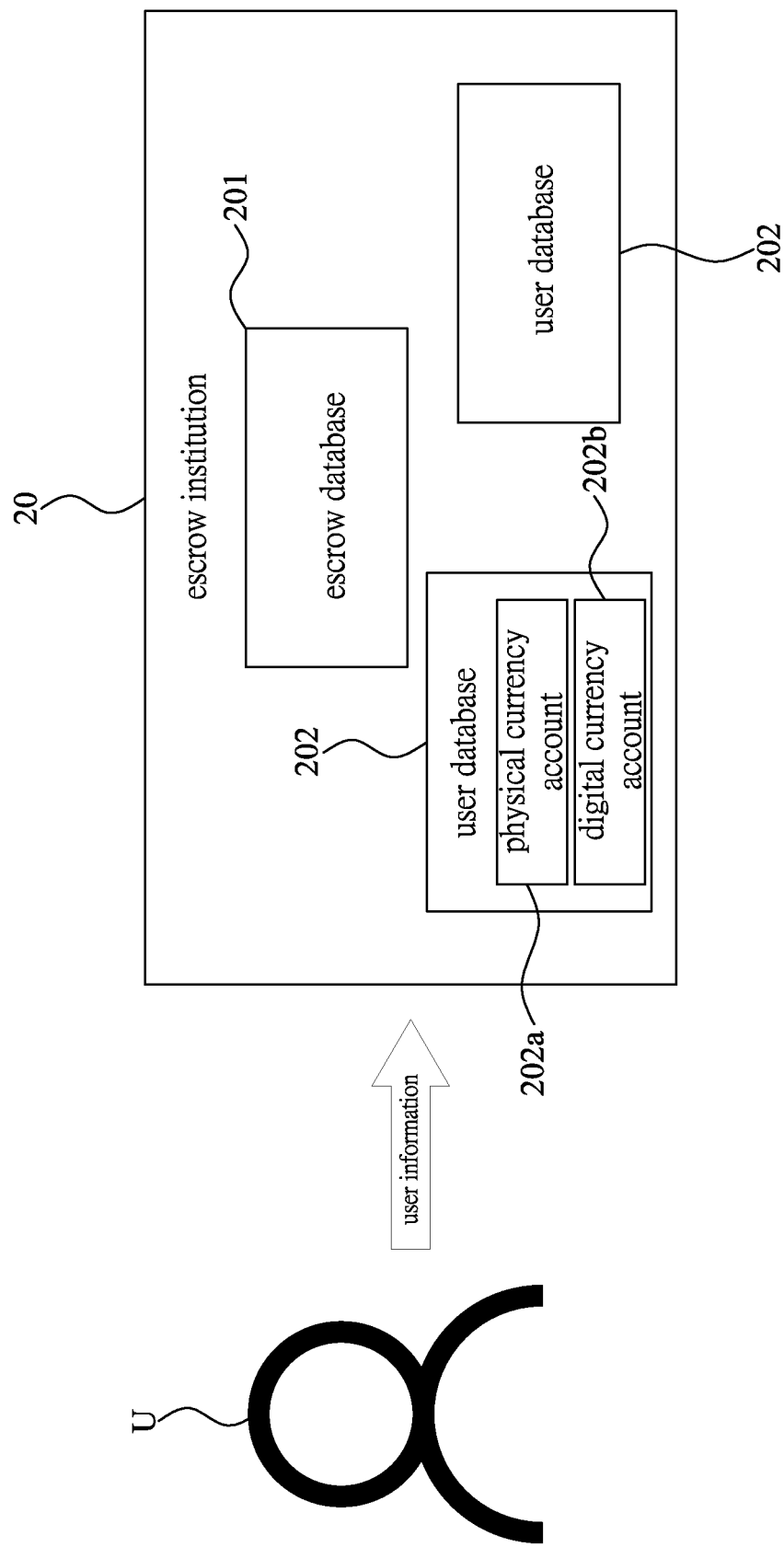
FIG. 3 is a schematic illustrating the user creating step in FIG. 1.

Please refer to FIGS. 1 and 3. When a user U having the electronic device 21 wants to apply for the storage carrier 22 for digital asset transaction, the user U having the electronic device 21 provides user information indicating user identity to the escrow institution 20; when the escrow institution 20 receives the user information, the escrow institution 20 stores the user information and creates a user database 202 according to the user information; the escrow institution 20 generates, according to the user database 202, a physical currency account 202a in the user database 202 and a digital currency account 202b in the user database 202, thus completing a user creating step S1. Wherein, the digital currency account 202b generates a piece of first private key information authorizing the transfer of digital currency and a piece of first public key information indicating a digital currency amount. In the present embodiment, the physical currency account 202a corresponds to the digital currency account 202b, and the escrow institution 20 would transmit the first private key information to the escrow database 201, and the physical currency account 202a is used to store the physical currencies (e.g., each national currency such as NTD, and US dollars), while the digital currency account 202b is used to store digital currencies (e.g., virtual internet currency such as bitcoin).

Figure 4:
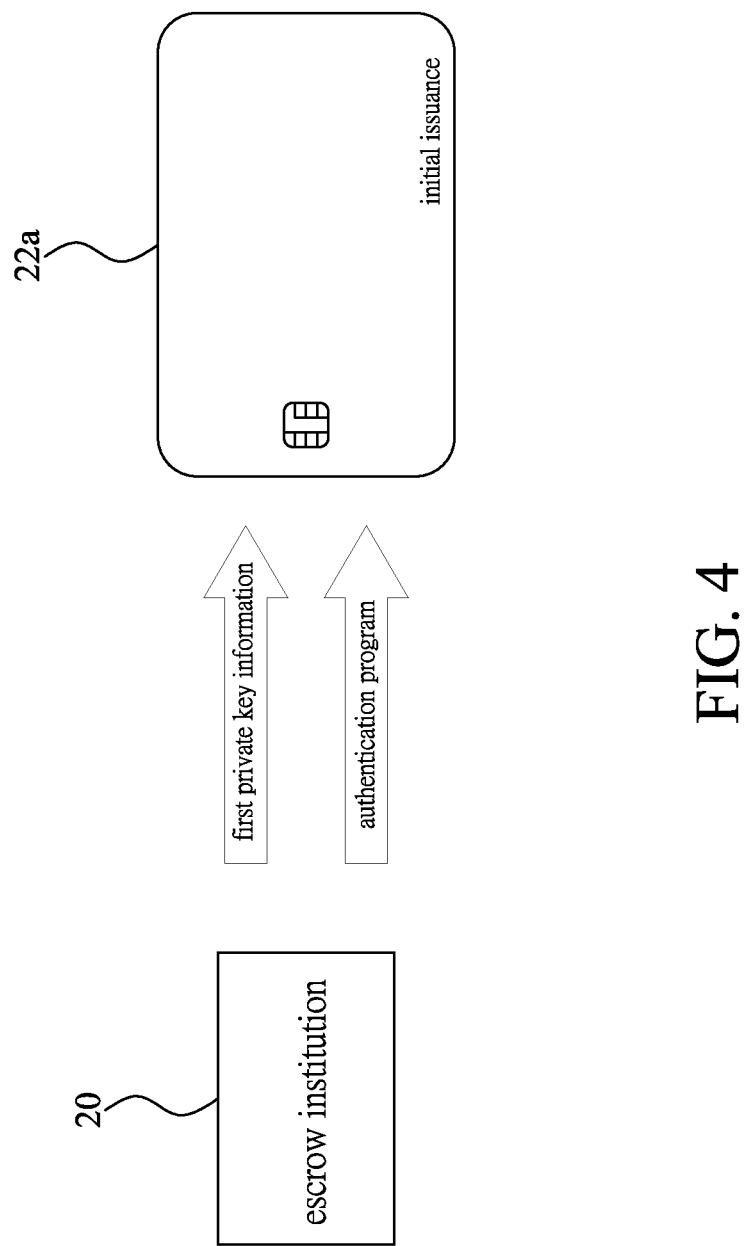
FIG. 4 is a schematic illustrating the carrier issuing step in FIG. 1.

Please refer to FIGS. 1 and 4, after completing the user creating step S1 and proceed to perform a carrier issuing step S2. The escrow institution 20 provides an authentication program for performing authentication, and generates a piece of first authentication information capable of starting the operation of the carrier 22 through the authentication program. The escrow institution 20 provides one of the carriers 22 to be set as a first carrier 22a and transmits the first private key information and the authentication program to the first carrier 22a, accordingly the first private key information is stored in the security chip 223 of the first carrier 22a. The authentication program is stored in the memory 222 of the first carrier 22a, such that the memory 222 of the first carrier 22a is stored with the authentication program to make the first carrier 22a changed to be in a restricted mode from the initial mode. When the first carrier 22a is in the restricted mode, the first carrier 22a is temporarily unable to perform digital currency transaction, and simultaneously the first carrier 22a also cannot be connected to any electronic device 21. Subsequently, the first carrier 22a in the restricted mode is issued to the user U having the electronic device 21. At this time, though the first carrier 22a is stored with the first private key information, the first carrier 22a would not show the information content of the first private key information. Accordingly, the user U having the electronic device 21 cannot know the information content of the first private key information. In this way, even if the first carrier 22a is lost and taken by others, the others still cannot know the first key information through the first carrier 22a, and thus cannot further perform the transaction of the digital currency.

Figure 5:
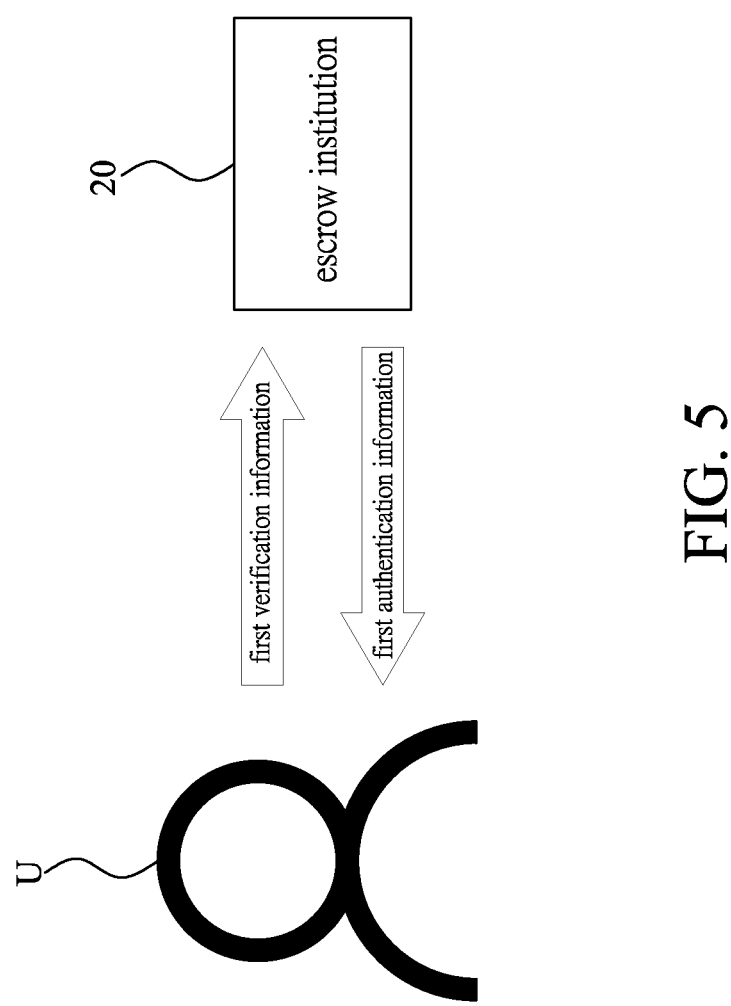
FIG. 5 is a schematic illustrating the first-authentication-information-providing step in FIG. 1.

Please refer to FIGS. 1 and 5. Subsequently, proceed to perform a first-authentication-information-providing step S3. The user U having the electronic device 21 provides first verification information for verifying user identity to the escrow institution 20, and the information content of the first verification information includes the user information; wherein when the escrow institution 20 receives the first verification information, the escrow institution 20 would confirm whether the user information of the first verification information is consistent with the user information of the escrow institution 20; when the escrow institution 20 confirms that the user information of the first verification information is consistent with the user information of the escrow institution 20, the escrow institution 20 would provide the first authentication information to the user U having the electronic device 21; conversely, when the escrow institution 20 confirms that the user information of the first verification information is not consistent with the user information of the escrow institution 20, the escrow institution 20 would not provide the first authentication information.

Figure 7:
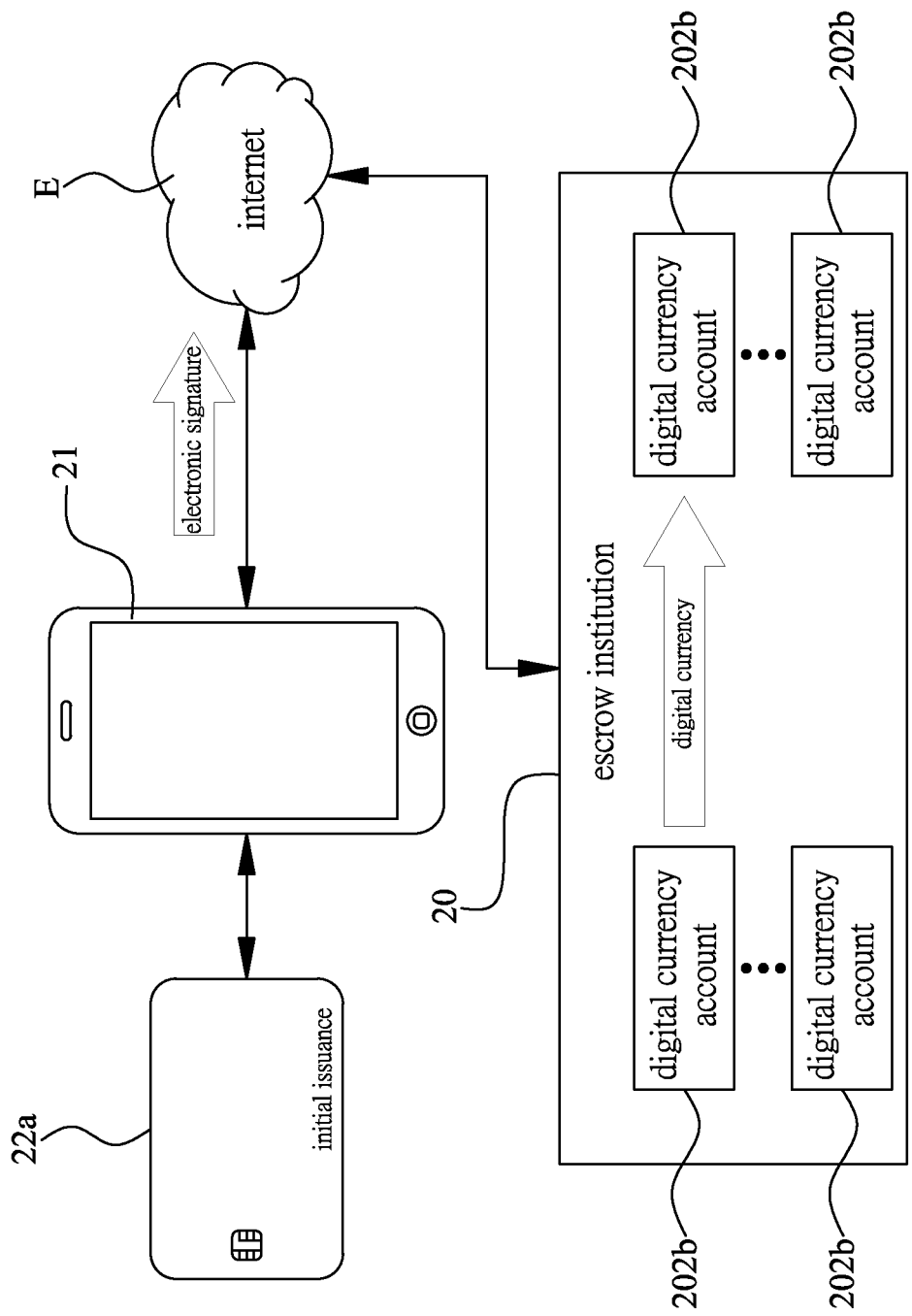
FIG. 7 is a schematic illustrating performance of the digital assets transaction.

In the present embodiment, the user U having the electronic device 21 can personally go to the escrow institution 20 to provide the first verification information, and the escrow institution 20 also can directly provide the first authentication information to the user U having the electronic device 21; or the electronic device 21 connects to the escrow institution 20 through the Internet E (as shown in FIG. 7), and the user U having the electronic device 21 generates the first verification information through the electronic device 21; the electronic device 21 would transmits the first verification information to the escrow institution 20 through the Internet E; accordingly, the escrow institution 20 compares whether the first verification information is consistent with the information content of the user information; however, the escrow institution 20 can also transmit the first authentication information to the electronic device 21 via the Internet E, so that the user U having the electronic device 21 can obtain the first authentication information; even the escrow institution 20 yet can use one of methods, like voice message, webpage, text message, EMAIL, and communication software, to notify the user U of the first authentication information. Wherein, when the electronic device 21 connects to the escrow institution 20 through the Internet E, the escrow institution 20 can provide the first public key information to the electronic device 21 to make the electronic device 21 show the information content of the first public key information, and thus the user U having the electronic device 21 can know the information content of the first public key information; in addition, the carrier 22 cannot directly connect to the Internet E, and must indirectly connect to the Internet E through the electronic device 21.

However, that the electronic device 21 connects to the escrow institution 20 necessarily through Internet E is merely in an attempt to explain conveniently. That is, in the carrier issuing step S2, the escrow institution 20 can transmit the first private key information, the authentication program and the first public key information to the first carrier 22a, such that the memory 222 of the first carrier 22a is stored with the public key information. In this way, when the electronic device 21 connects to the first carrier 22a, the electronic device 21 can obtain the public key information from the first carrier 22a, and thus the user U know the information content of the public key information; or the escrow institution 20 also can notify the user U of the public key information through the one of methods like voice message, webpage, text message, EMAIL, and communication software.

Figure 6:
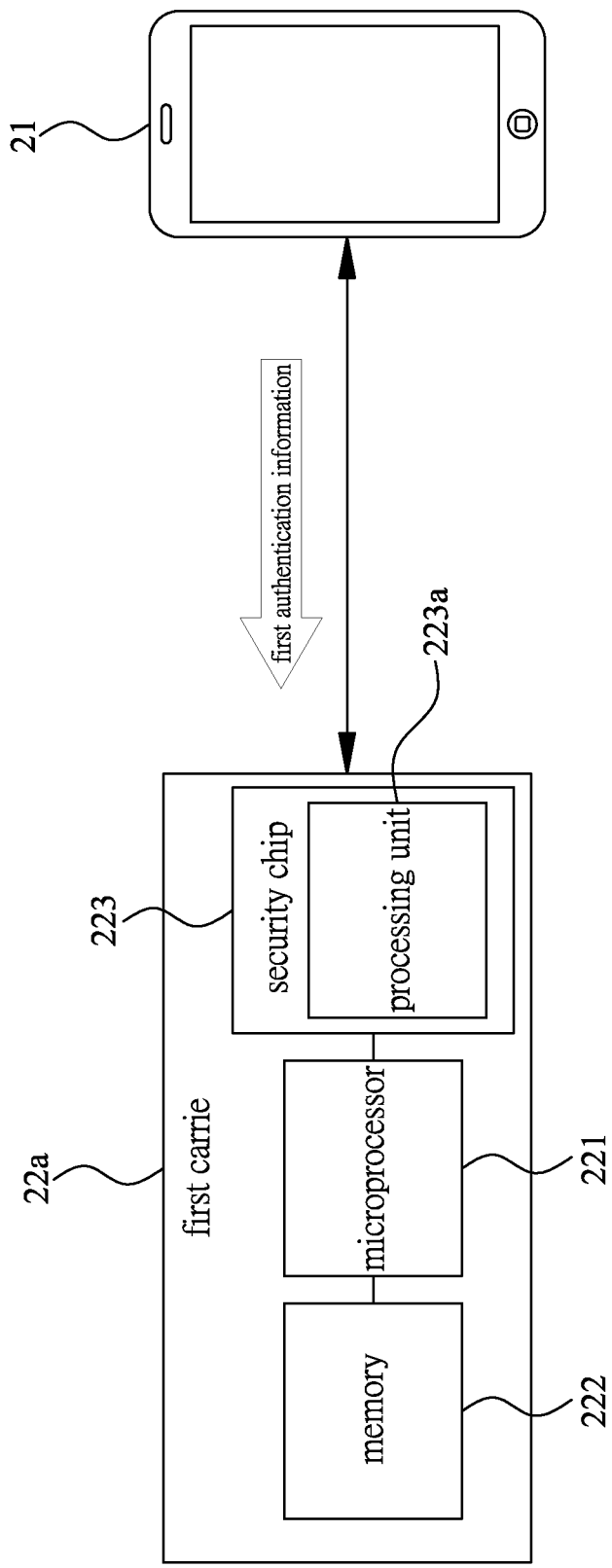
FIG. 6 is a schematic illustrating the first authentication step in FIG. 1.

Please refer to FIGS. 1 and 6. Last, perform a first authentication step S4. When the user U having the electronic device 21 obtains the first authentication information, the electronic device 21 is connected to the first carrier 22a to make the microprocessor 221 of the first carrier 22a run the authentication program stored in the memory 222. The user U inputs the first authentication information via the electronic device 21 to make the electronic device 21 transmit the first authentication information to the first carrier 22a, and thus the authentication program stored in the first carrier 22 performs the first authentication information to make the memory 222 of the first carrier 22a store the identification code of the electronic device 21. Accordingly, the first carrier 22a consents to connect to the electronic device 21, such that the first carrier 22a is switched to be in an unlocked mode from the restricted mode. Conversely, when information content inputted by the user U via the electronic device 21 is not the first authentication information, the authentication program stored in the first carrier 22a would not perform operation on the information content inputted by the user U, and thus the first carrier 22a is still in the restricted mode, and therefore the first carrier 22a is unable to be in the unlocked mode.

Please refer to FIG. 7. When the digital asset transaction is to be performed, the electronic device 21 is connected to the first carrier 22a. At this time, the memory 222 of the first carrier 22a is stored with the identification code of the electronic device 21, so the first carrier 22a is in the unlocked mode; accordingly the first carrier 22a generates an electronic signature corresponding to the first private key information and transmits the electronic signature to the electronic device 21, and then the electronic device 21 transmits the electronic signature to the escrow institution 20 via the Internet E; once the escrow institution 20 receives the electronic signature, the digital currency of the digital currency account 202b is transferred to another digital currency account 202b, and the physical currency account 202a receives the physical currency of another physical currency account 202a.

However, when the first carrier 22a connects to the unauthenticated electronic device 21, the memory 222 of the first carrier 22a is not stored with the identification code of the unauthenticated electronic device 21, so that the first carrier 22a is in the restricted mode, and thus the first private key information cannot be transmitted to the unauthenticated electronic device 21, making the digital currency of the digital currency account 202b unable to be transferred.

Figure 8:
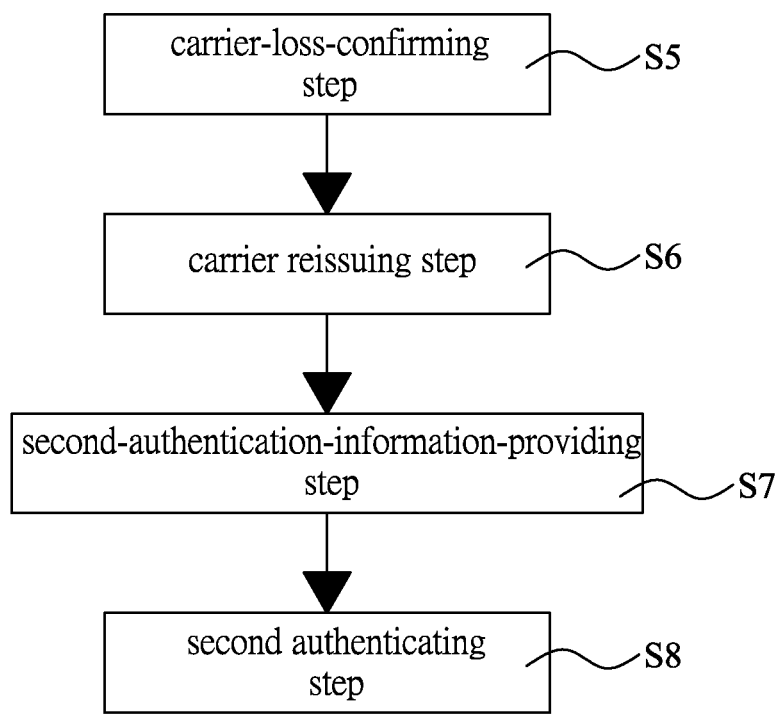
FIG. 8 is a schematic illustrating process flowchart of reissuing a carrier in the authentication method for e-wallet carrier of the present invention.
Figure 9:
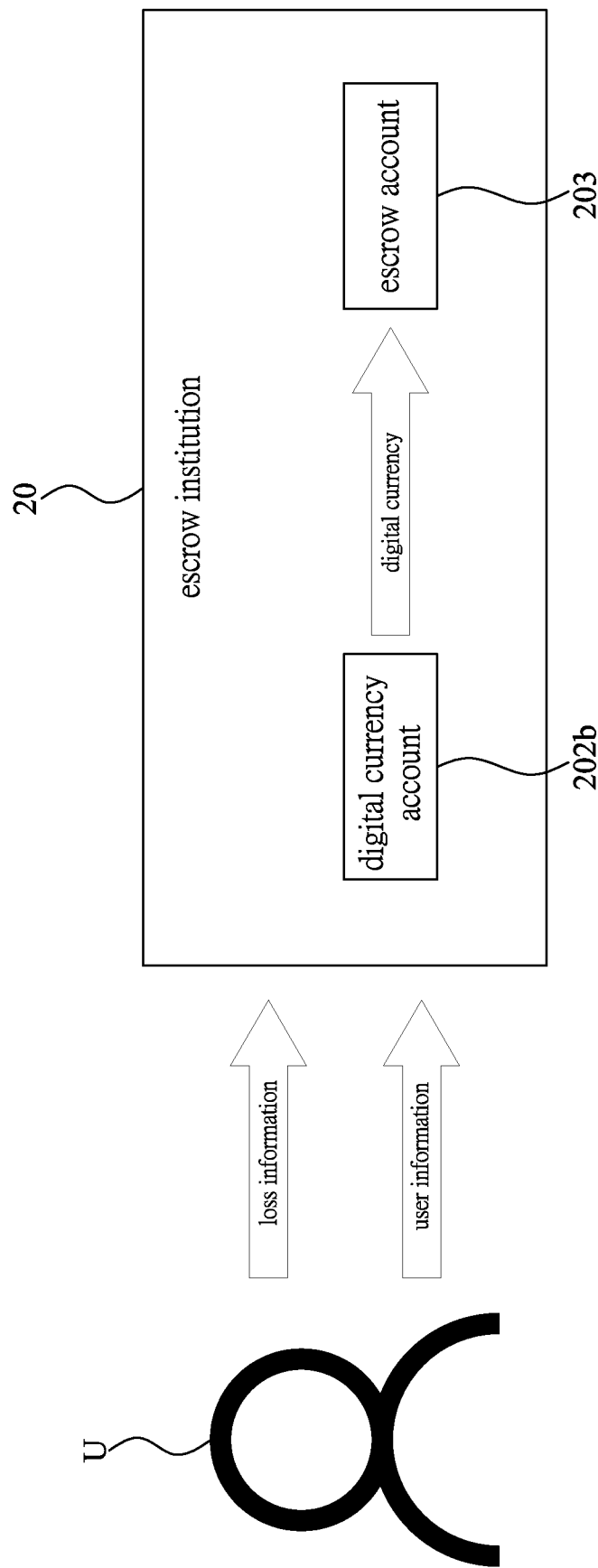
FIG. 9 is a schematic illustrating the carrier-loss-confirming step in FIG. 8.

Please refer to FIGS. 8 and 9. When the user U having the electronic device 21 loses the carrier 22 and applies to the escrow institution 20 for reissuing another carrier 22, the user U having the electronic device 21 provides loss information showing that the carrier 22 has been lost and the user information to the escrow institution 20. When the escrow institution 20 simultaneously receives the loss information and the user information, the escrow institution 20 would use the first private key information corresponding to the user information to transfer the digital currency of the public key information to an escrow account 203. In the present embodiment, the escrow account 203 has private key information and public key information, and the escrow institution 20 would transfer the digital currency of the first public key information to the public key information of the escrow account 203; subsequently, the escrow institution 20 re-generates second private key information authorizing the transfer of the digital currency for the digital currency account 202b and the second public key information capable of indicating the digital currency amount, thus completing a carrier-loss-confirming step S5. Wherein, the information content of the second private key information and first private key information are different, and the information content of the second public key information is not the same as that of the first public key information. Furthermore, the escrow institution 20 would transmit the second private key information to the escrow database 201.

Figure 10:
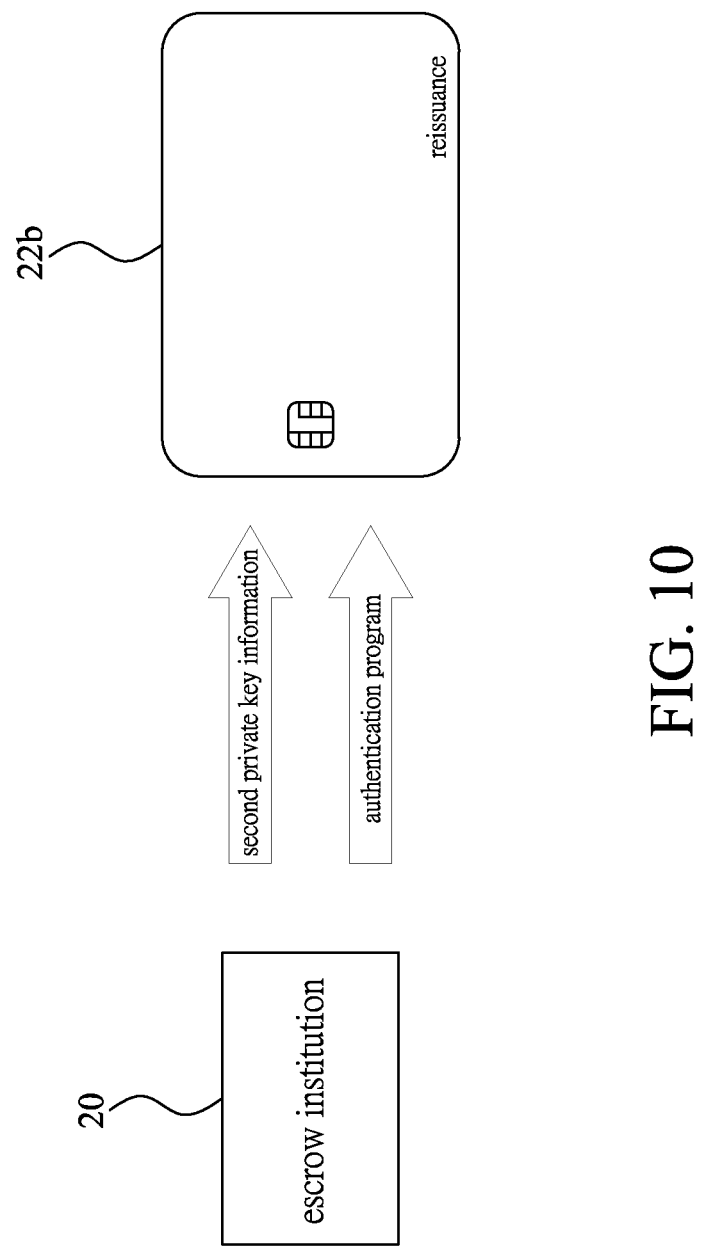
FIG. 10 is a schematic illustrating the carrier reissuing step in FIG. 8.

Please refer to FIGS. 8 and 10. After completing the carrier-loss-confirming step S5 and proceed to perform a carrier reissuing step S6. The escrow institution 20 generates, through the authentication program, second authentication information capable of starting the operation of the carrier 22; the escrow institution 20 prepares another carrier 22 to be set as a second carrier 22b, and transmits the second private key information and the authentication program to the second carrier 22b; accordingly the second private key information is stored in the security chip 223 of the second carrier 22b, and the authentication program is stored in the memory 222 of the second carrier 22b; the memory 222 of the second carrier 22b is stored with the authentication program, and thus to switch the second carrier 22b to be in the restricted mode. Subsequently, the second carrier 22b in the restricted mode is reissued to the user U having the electronic device 21.

Figure 11:
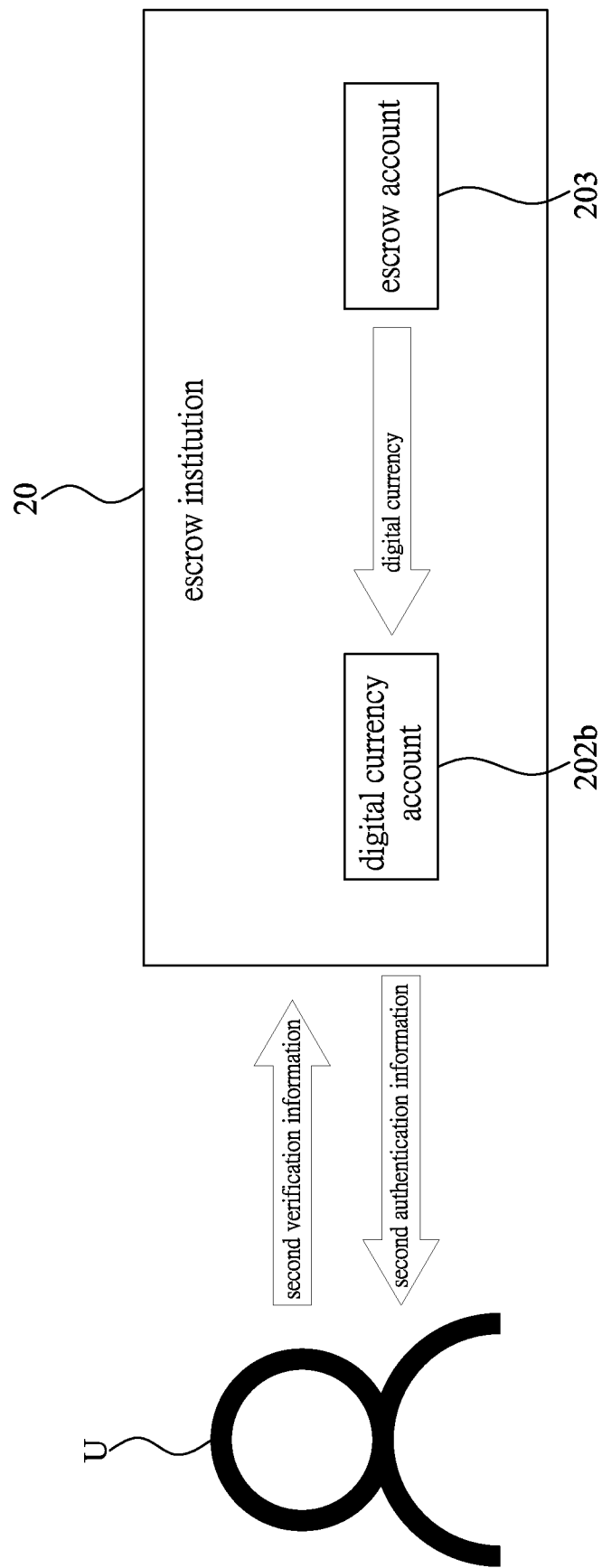
FIG. 11 is a schematic illustrating the second-authentication-information-providing step in FIG. 8.

Please refer to FIGS. 8 and 11. Subsequently perform a second-authentication-information-providing step S7. The user U having the electronic device 21 provides second verification information used to verify user identity to the escrow institution 20, and the second verification information includes the user information; wherein, when the escrow institution 20 receives the second verification information, the escrow institution 20 would confirm whether the user information of the second verification information is consistent with the user information stored in the escrow institution 20; when the escrow institution 20 confirms that the user information of the second verification information is consistent with the user information stored in the escrow institution 20, the escrow institution 20 would provide the second authentication information to the user U having the electronic device 21. Then at this time, the escrow institution 20 transfers the digital currency of the escrow account 203 to the second public key information of the digital currency account 202b; conversely, when the escrow institution 20 confirms that the user information of the second verification information is not consistent with the user information stored in the escrow institution 20, neither would the escrow institution 20 provide the second authentication information to the user U having the electronic device 21, nor would the escrow account 203 transfer the digital currency to the first public key information or the second public key information of the digital currency account 202b, such that the escrow account 203 is still stored with the digital currency.

Figure 12:
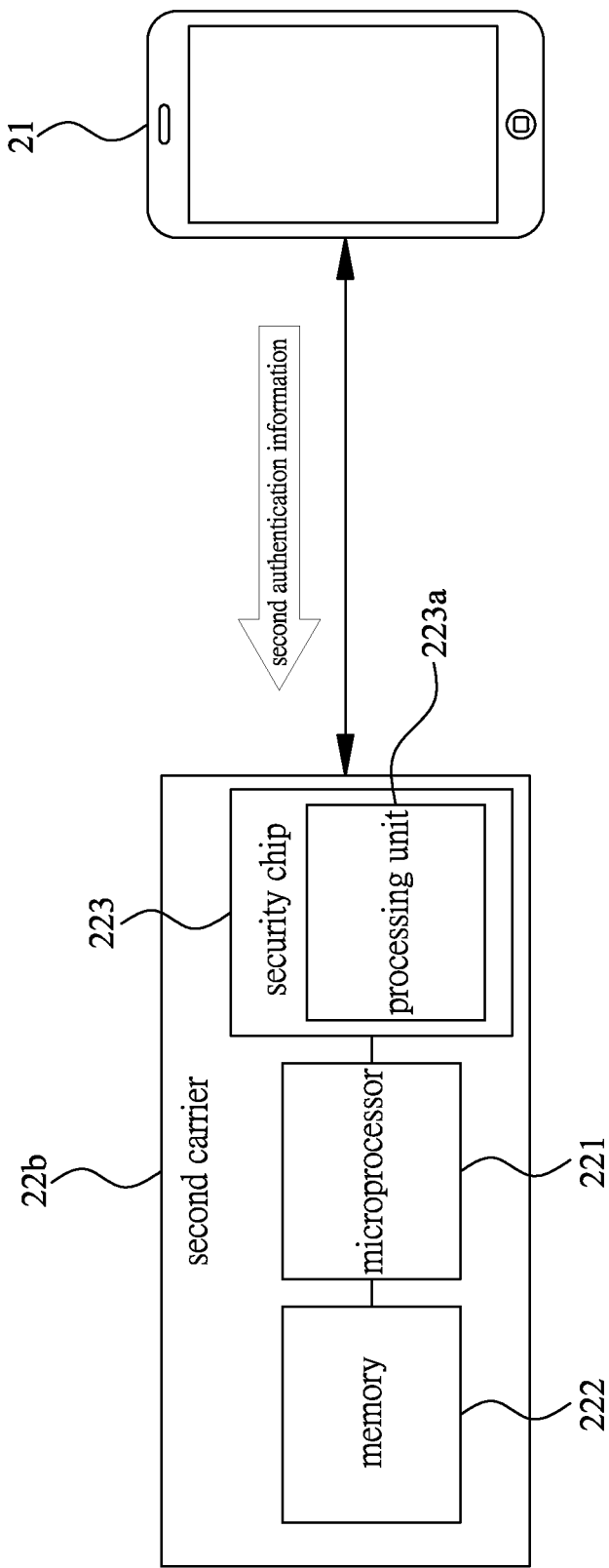
FIG. 12 is a schematic illustrating the second authentication step in FIG. 8.

Please refer to FIGS. 8 and 12. Last, perform a second authentication step S8. When the user U having the electronic device 21 obtains the second authentication information, the electronic device 21 is connected to the second carrier 22b to make the microprocessor 221 of the second carrier 22b run the authentication program stored in the memory 222. The user U inputs the second authentication information via the electronic device 21 to make the electronic device 21 transmit the second authentication information to the second carrier 22b, and accordingly the authentication program stored in the second carrier 22b performs the second authentication information to make the memory 222 of the second carrier 22b store the identification code of the electronic device 21. Thus, the second carrier 22b consents to connect to the electronic device 21, which makes the second carrier 22b switched to be in an unlocked mode to perform the transfer of the digital currency.

Figure 13:
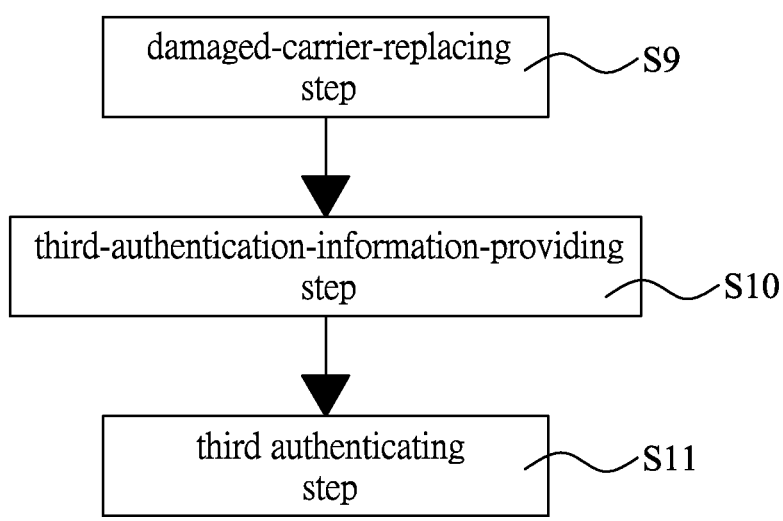
FIG. 13 is a schematic illustrating process flowchart of replacing a carrier in the authentication method for e-wallet carrier of the present invention.
Figure 14:
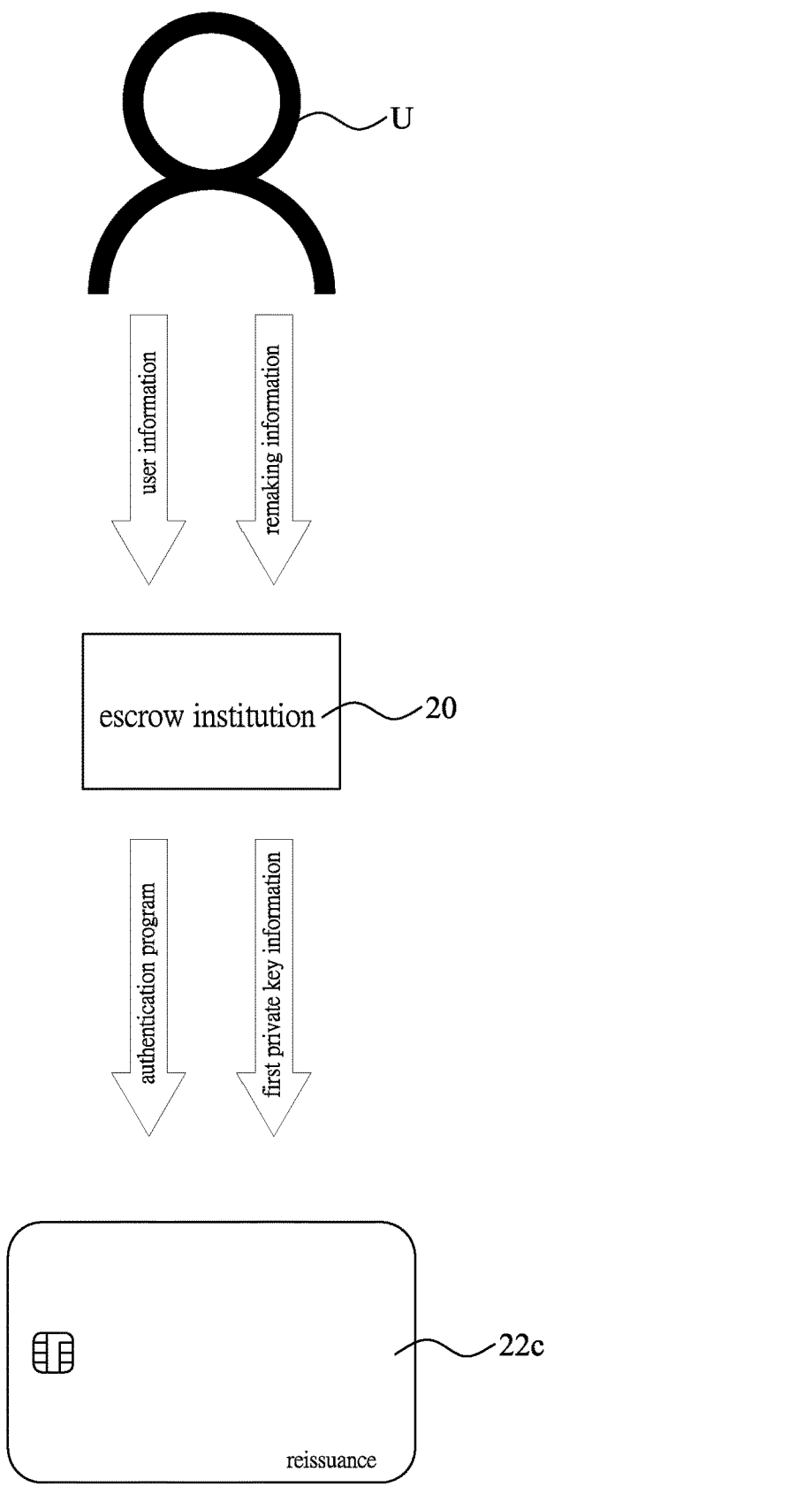
FIG. 14 is a schematic illustrating the damaged-carrier-replacing step in FIG. 13.

Please refer to FIGS. 13 and 14. When the carrier 22 is damaged, the user U having the electronic device 21 applies to the escrow institution 20 for reissuing another carrier 22. First, a damaged-carrier-replacing step S9 is performed. The user U having the electronic device 21 provides remaking information showing the damage of the carrier 22 and the user information to the escrow institution 20. When the escrow institution 20 receives the remaking information and the user information, the escrow institution 20 would create a piece of third authentication information generated by the authentication program. Subsequently, the escrow institution 20 provides one of the carriers 22 to be set as a third carrier 22c, and transmits the first private key information corresponding to the user information and the authentication program to the third carrier 22c, allowing the first private key information to be stored in the security chip 223 of the third carrier 22c, and allowing the authentication program to be stored in the memory 222 of the third carrier 22c; the memory 222 of the third carrier 22c is stored with the authentication program, and thus to switch the third carrier 22c to be in the restricted mode. Subsequently, the third carrier 22c in the restricted mode is issued to the user U having the electronic device 21 as a replacement.

Figure 15:
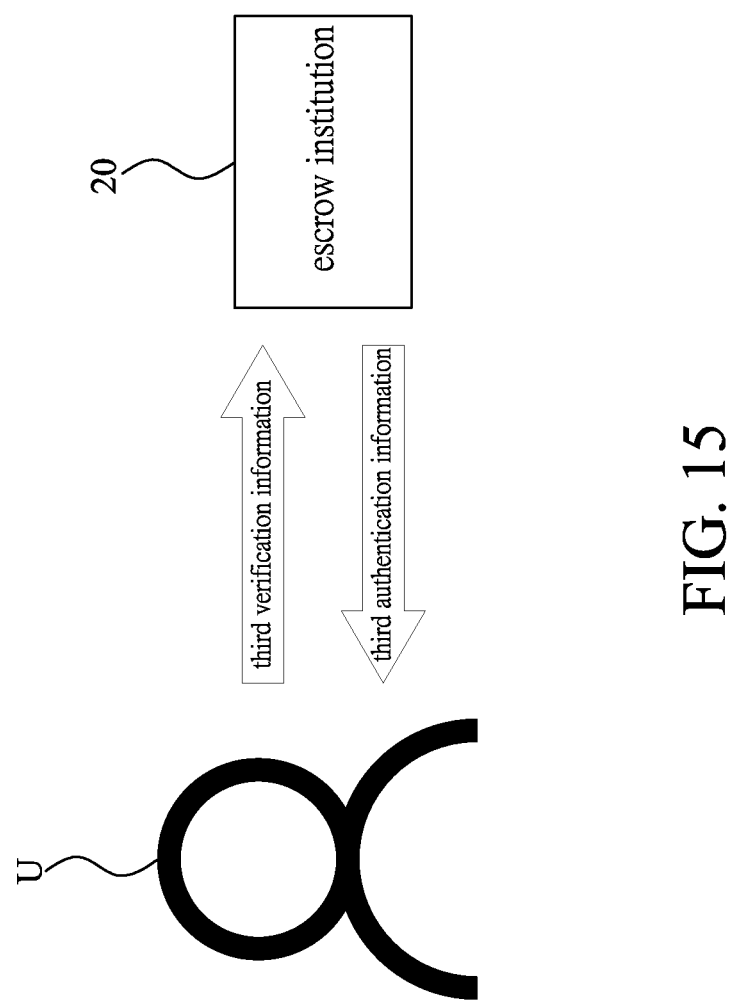
FIG. 15 is a schematic illustrating the third-authentication-information-providing step in FIG. 13.

Please refer to FIGS. 13 and 15. After completing the damaged-carrier-replacing step S9 and proceed to perform a third-authentication-information-providing step S10. The user U having the electronic device 21 provides third verification information used to verify user identity to the escrow institution 20, and the third verification information includes the user information; wherein, when the escrow institution 20 receives the third verification information, the escrow institution 20 would confirm whether the user information of the third verification information is consistent with the user information stored in the escrow institution 20; when the escrow institution 20 confirms that the user information of the third verification information is consistent with the user information stored in the escrow institution 20, the escrow institution 20 would provide the third authentication information to the user U having the electronic device 21.

Figure 16:
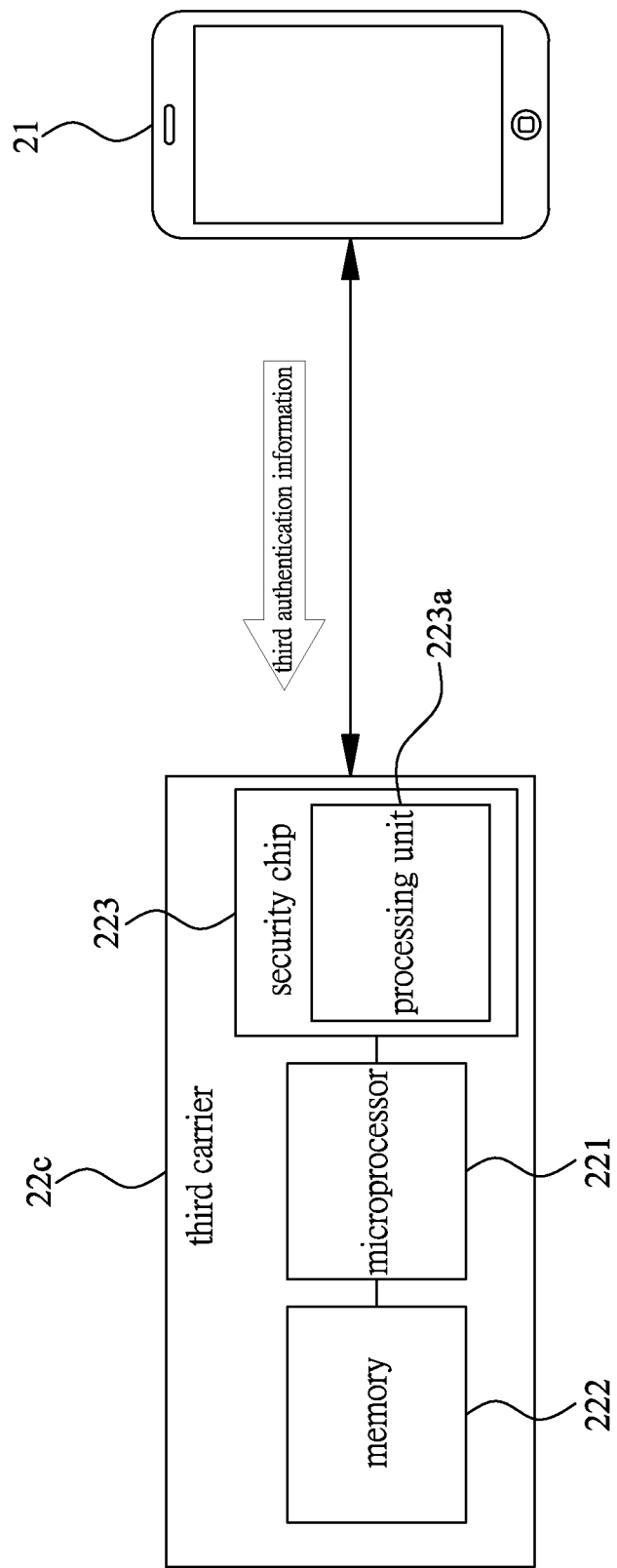
FIG. 16 is a schematic illustrating the third authentication step in FIG. 13.

Please refer to FIGS. 13 and 16. Finally, perform a third authentication step S11. When the user U having the electronic device 21 obtains the third authentication information, the electronic device 21 is connected to the third carrier 22c to make the microprocessor 221 of the third carrier 22c run the authentication program stored in the memory 222. The user U inputs the third authentication information via the electronic device 21 to make the electronic device 21 transmit the third authentication information to the third carrier 22c, and accordingly the authentication program stored in the third carrier 22c performs the third authentication information to make the memory 222 of the third carrier 22c store the identification code of the electronic device 21. Thus, the third carrier 22c is authenticated on the electronic device 21, which makes the third carrier 22c switched to be in an unlocked mode to perform the transaction of the digital currency.

The above-instanced embodiments are used for conveniently describing the present invention, not further to limit it. For the person skilled in the art of the disclosure, without departing from the concept of the disclosure, simple modifications or changes can be made and should be included in the following claims and their equivalents of the present application.

What is claimed is:

1. An authentication method for an e-wallet carrier, the authentication method comprising:
   a user creating step, in which
      an escrow institution comprising a user database stored with user information creates a piece of first private key information and a piece of first public key information according to the user database;
   a carrier issuing step, in which
      the escrow institution generates a piece of first authentication information according to an authentication program, and
      the first private key information and the authentication program are stored into a first integrated circuit card that serves as the e-wallet carrier, the first integrated circuit card being in a restricted mode in which no digital currency transaction is permitted, and then the first integrated circuit card is issued to the user;
   a first authentication-information-providing step, in which upon determining that the user obtains the first integrated circuit card, the escrow institution receives first verification information including the user information from the user and provides the first authentication information to the user, to thereby confirm that the user information of the first verification information is correct; and
   a first authenticating step, in which the first integrated circuit card receives the first authentication information inputted by the user via an electronic device,
      the first integrated circuit card processes the first authentication information using the authentication program to thereby store an identification code of the electronic device, so that an operation mode of the first integrated circuit card changes from the restricted mode to an unlocked mode in which a digital currency transaction is permitted, and
      the first integrated circuit card performs the digital currency transaction via the electronic device.

2. The authentication method according to claim 1, wherein the escrow institution provides the first authentication information to the user by one method of voice message, webpage, text message, EMAIL, and communication software.

3. The authentication method according to claim 1, wherein the method further comprises:
   a carrier-loss-confirming step, in which
      the escrow institution receives the user information and a piece of loss information showing that the first integrated circuit card is lost, and accordingly
      the escrow institution uses the first private key information corresponding to the user information to transfer the digital currency of the public key information to an escrow account, and then creates a piece of second private key information and a piece of second public key information according to the user database;
   a carrier reissuing step, in which
      the escrow institution creates second authentication information generated by the authentication program, and
      the escrow institution transmits the second private key information and the authentication program to a second integrated circuit card as the e-wallet carrier, and then
      the second integrated circuit card is reissued to the user;
   a second authentication-information-providing step, in which
      upon determining that the user has obtained the second integrated circuit card, the escrow institution receives second verification information including the user information from the user and provides the second authentication information to the user to thereby confirm that the user information of the second verification information is correct, and then
      the escrow institution transfers the digital currency of the escrow account to the second public key information of the user database; and
   a second authentication step, in which
      the second integrated circuit card is connected to the electronic device and receives the second authentication information inputted by the user via the electronic device, and then
      the second integrated circuit card is accordingly switched to be in the unlocked mode.

4. The authentication method according to claim 3, wherein in the second authentication-information-providing step, the escrow institution, upon confirming that the user information of the second verification information is incorrect, withholds transferring of the digital currency to either of the first public key information or the second public key information of the user database.

5. The authentication method according to claim 3, wherein the method further comprises:

a damaged-carrier-replacing step, in which responsive to the escrow institution receiving the user information and a piece of damaged information showing the damage of the first integrated circuit card, the escrow institution creates a piece of third authentication information generated by the authentication program, and transmits the authentication program and the first private key information corresponding to the user information to a third integrated circuit card as the e-wallet carrier, and then the third integrated circuit card is issued to the user as a replacement;

a third authentication-information-providing step, in which upon determining that the user has obtained the third integrated circuit card, the escrow institution receives third verification information including the user information from the user and provides the third authentication information to the user, to thereby confirm that the user information of the third verification information is correct; and a third authentication step, in which the third integrated circuit card is connected to the electronic device and receives the third authentication information inputted by the user via the electronic device, and then the third integrated circuit card is accordingly switched to be in the unlocked mode.

\* \* \* \* \*